United States Patent

Maehara

[11] Patent Number: 6,116,702
[45] Date of Patent: Sep. 12, 2000

[54] DEVICE FOR CONTROLLING PRESSURE OF BRAKE FLUID

[75] Inventor: Toshifumi Maehara, Saitama, Japan

[73] Assignee: Akebono Brake Industry Co., Ltd., Tokyo, Japan

[21] Appl. No.: 09/054,451

[22] Filed: Apr. 3, 1998

[30] Foreign Application Priority Data

Apr. 9, 1997 [JP] Japan ............................. 9-090486

[51] Int. Cl.[7] ............................................. B60T 8/40
[52] U.S. Cl. .................... 303/116.1; 303/113.1; 303/115.4; 303/84.2
[58] Field of Search ............... 303/115.4, 116.1, 303/116.2, 113.1, 113.2, 113.5, 84.2

[56] References Cited

U.S. PATENT DOCUMENTS

| | | | |
|---|---|---|---|
| 3,773,362 | 11/1973 | Lewis | 188/349 |
| 4,453,782 | 6/1984 | Arikawa et al. | 303/116.1 |
| 5,281,012 | 1/1994 | Binder et al. | 303/113.5 |
| 5,401,083 | 3/1995 | Altmann et al. | 303/113.2 |
| 5,564,798 | 10/1996 | Zaviska et al. | 303/116.1 |
| 5,586,814 | 12/1996 | Steiner | 303/116.2 |

FOREIGN PATENT DOCUMENTS

| | | |
|---|---|---|
| 0 800 975 A2 | 10/1997 | European Pat. Off. . |
| 8-58560 | 3/1996 | Japan . |
| 2 297 134 | 7/1996 | United Kingdom . |

Primary Examiner—Robert J. Oberleitner
Assistant Examiner—M. Sy
Attorney, Agent, or Firm—Morgan, Lewis & Bockius LLP

[57] ABSTRACT

A device for controlling pressure of brake fluid having an anti-lock control device arranged in a pipe communicating a master cylinder with a wheel cylinder, comprising: a passage shut-off device arranged in a passage communicating a holding valve, which is a component of the anti-lock control device, with a master cylinder, to shut off the passage when fluid pressure generated in the master cylinder exceeds a predetermined value; and a switch valve arranged in a bypass passage communicating an upper stream side passage of the passage shut-off device with a suction port of a hydraulic pump, to open the passage when the passage shut-off valve shuts off the passage, wherein when the passage shut-off device closes the passage, the hydraulic pump in the anti-lock control device is operated, so that brake fluid in the master cylinder can be sucked via the switch valve and fed into the wheel cylinder.

4 Claims, 5 Drawing Sheets

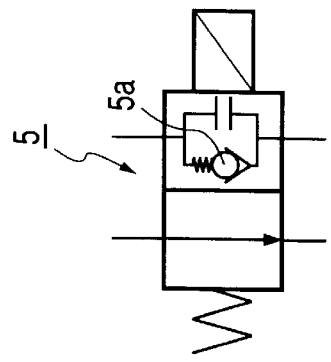
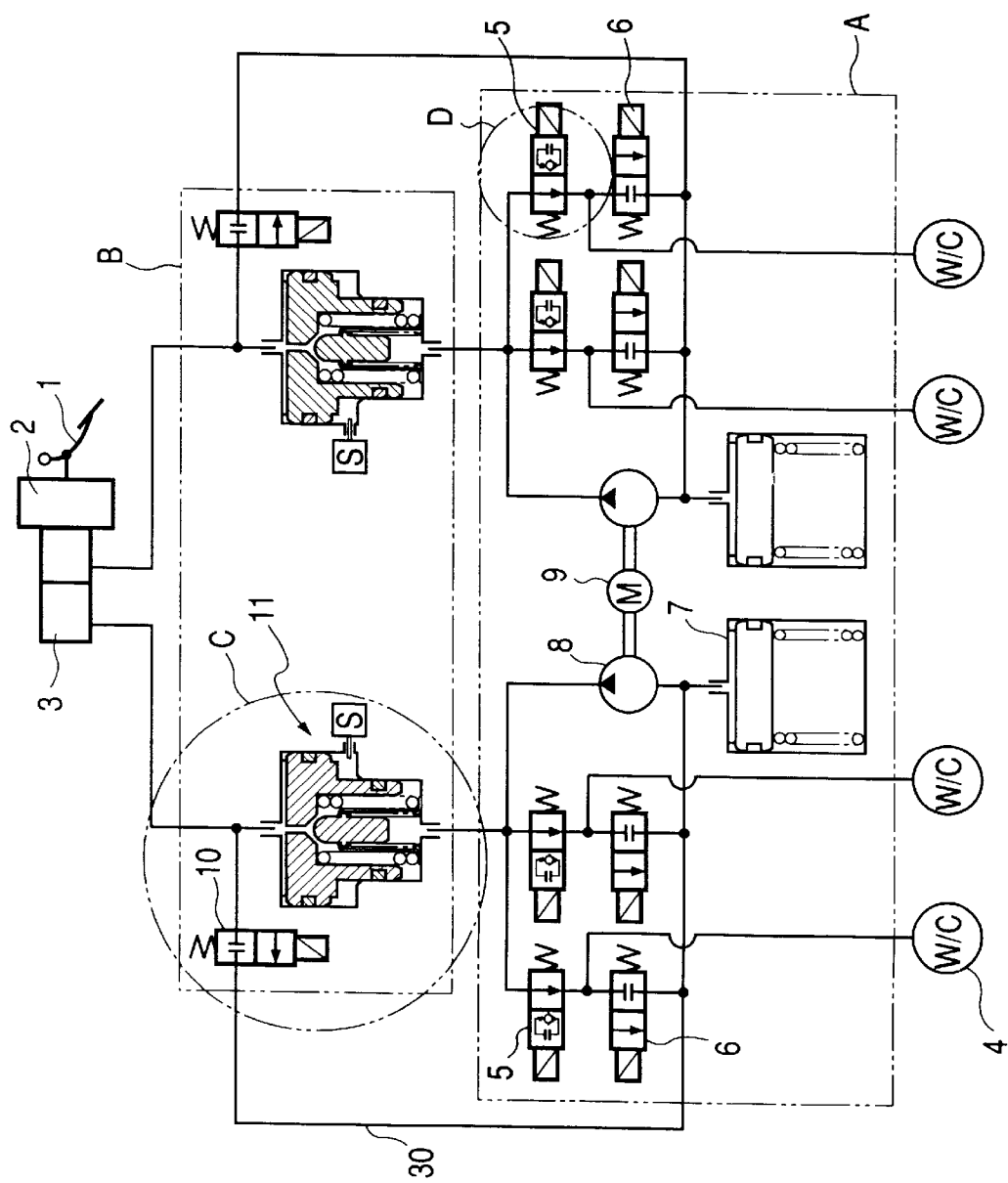

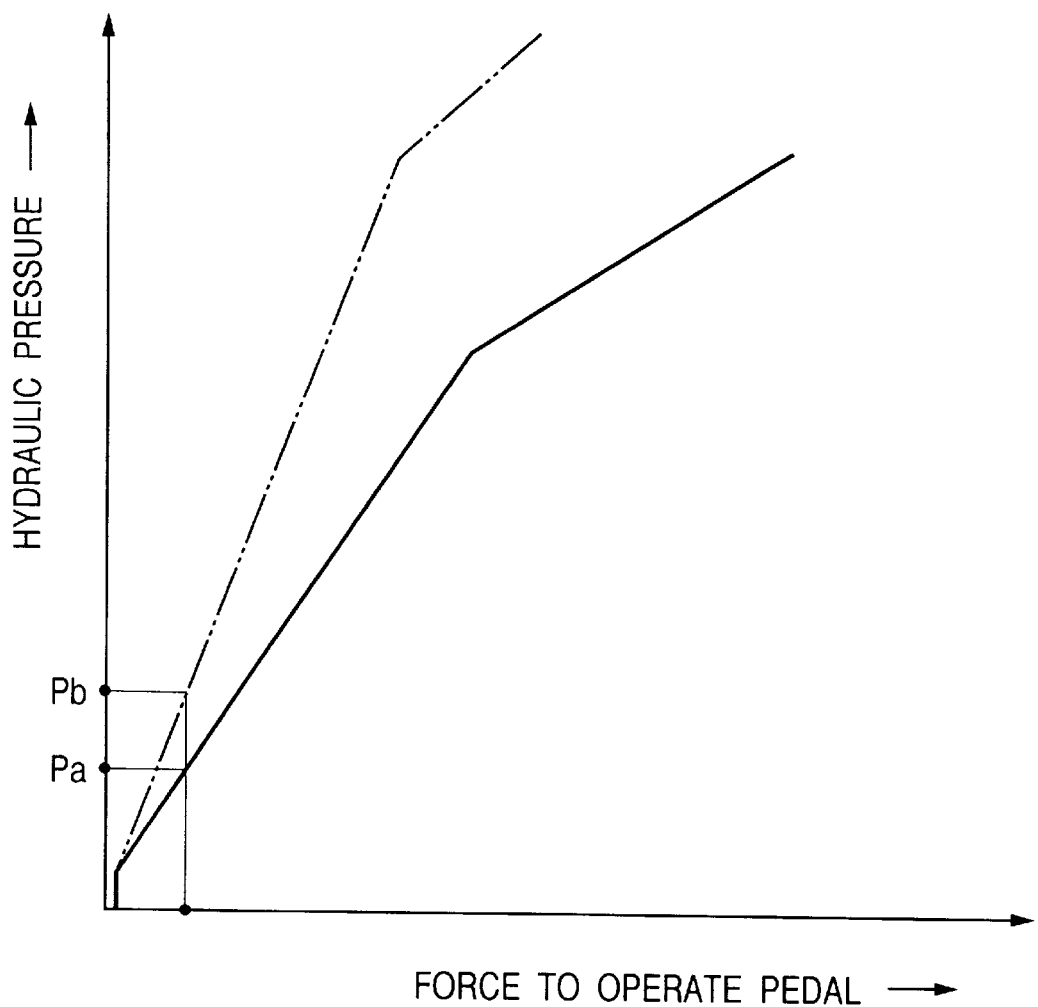

DEVICE FOR CONTROLLING PRESSURE OF BRAKE FLUID

BACKGROUND OF THE INVENTION

1. Field of the Invention

The present invention relates to a device for controlling pressure of brake fluid having a function of multiplying a brake force. More particularly, the present invention relates to a device for controlling pressure of brake fluid by which a function of multiplying a brake force, the multiplying factor of which is high, can be exhibited in the case of a normal operation and a braking force higher than that of a conventional device for controlling pressure of brake fluid can be obtained even in the case of a power failure of the boosting device.

2. Description of the Related Art

In general, inexperienced drivers and even experienced drivers, who have been seized with a panic, can not put on the brakes strongly, and it is impossible for the drivers to put on the brakes strongly over a long period of time. For the above reasons, automobile engineers have been developing a device for controlling pressure of brake fluid including an anti-lock control system by which the brake performance can be exhibited at the maximum.

In this connection, in the device for controlling pressure of brake fluid provided with a vacuum booster or hydraulic pressure booster, when a large-capacity booster is adopted to obtain a brake force of high intensity so as to meet the above requirements, the sensitivity of the booster is increased too high when a driver puts on the brakes weakly or when an automobile is running in a low deceleration range. Therefore, problems about safety may be caused. That is, as shown in FIG. 5, when the boosting function is simply enhanced in the brake device provided with a conventional booster, brake fluid pressure Pb is increased too high compared with brake fluid pressure Pa in the case of the conventional brake device when the driver puts on the brakes weakly, in other words, the sensitivity is too high. Therefore, the same problems as those caused in the case of suddenly applying the brakes are encountered. In the case of a failure of a booster, the boosting function of which is enhanced, it becomes impossible to generate a sufficiently high brake force, which causes problems about safety.

In order to solve the above problems, for example, there is disclosed a brake device in Japanese Patent Publication No. Hei. 8-58560.

The brake device disclosed in Japanese Unexamined Patent Publication No. 8-58560 comprises: a master cylinder to give brake fluid pressure to the wheel cylinder; a brake fluid pressure booster for multiplying a force given to the brake pedal by a predetermined ratio of multiplication so as to transmit the multiplied pressure to the master cylinder, arranged between the brake pedal and the master cylinder; a pressure intensifying mechanism to intensify the brake fluid pressure of the master cylinder so as to transmit the intensified pressure to the wheel cylinder, arranged in the brake fluid passage communicating the wheel cylinder with the master cylinder; and a control valve to operate the pressure intensifying mechanism in the case of a failure of the above brake fluid pressure booster. In the above brake device, when the brake fluid booster is out of order because of a failure of a brake fluid pressure source, the control valve acts immediately and conducts intensifying the brake force. Therefore, it is possible to prevent a delay of braking operation.

However, in the above intensifying mechanism, the following problems may be encountered. Both the brake fluid pressure booster and the intensifying mechanism are arranged in one system. Accordingly, the intensifying mechanism can not operate in the case of a normal operation. Therefore, it is impossible for the above intensifying mechanism to solve the problems caused when a driver is seized with panic and puts on the brakes too weakly in case of emergency. Further, the mechanism to make up for the failure of brake power is complicated, and the equipment cost is raised.

SUMMARY OF THE INVENTION

It is an object of the present invention to provide a device for controlling pressure of brake fluid in which the brake fluid pressure booster has two systems, and when the pressurizing mechanism of the anti-lock control device is utilized as a second booster, brake fluid pressure higher than that of the conventional device can be provided in the case of a normal operation, and even in the case of a failure of the power source, the brake fluid boosting function can be positively provided by utilizing the brake fluid pressure sent from the second pressurizing source.

In the present invention, the pressurizing source in the anti-lock control device is utilized, and when the brake fluid pressure boosting function is executed by the pressurizing source, it is possible to conduct the boosting operation only by a volume of brake fluid that has been fed from the master cylinder. Accordingly, the conventional booster can be used as the second booster including components such as a pressurizing source, master cylinder and valves. Therefore, the cost of the entire system can be decreased.

In order to achieve the above object, there is provided a device for controlling pressure of brake fluid having an anti-lock control device arranged in a pipe communicating a master cylinder with a wheel cylinder according to the present invention, comprising: a passage shut-off device arranged in a passage communicating a holding valve, which is a component of the anti-lock control device, with a master cylinder, to shut off the passage when fluid pressure generated in the master cylinder exceeds a predetermined value; and a switch valve arranged in a bypass passage communicating an upper stream side passage of the passage shut-off device with a suction port of a hydraulic pump, to open the passage when the passage shut-off valve shuts off the passage, wherein, when the passage shut-off device closes the passage, the hydraulic pump in the anti-lock control device is operated, so that brake fluid in the master cylinder can be sucked via the switch valve and fed into the wheel cylinder.

BRIEF DESCRIPTION OF THE DRAWINGS

In the accompanying drawings:

FIG. 1(a) is an arrangement view of the device for controlling pressure of brake fluid of an embodiment according to the present invention, and FIG. 1(b) is an enlarged view of portion D shown in FIG. 1(a);

FIG. 5 is a diagram showing a relation between the hydraulic pressure of brake fluid and the force to operate the brake pedal of the conventional device for controlling pressure of brake fluid.

DETAILED DESCRIPTION OF THE PREFERRED EMBODIMENTS

Figure 2:
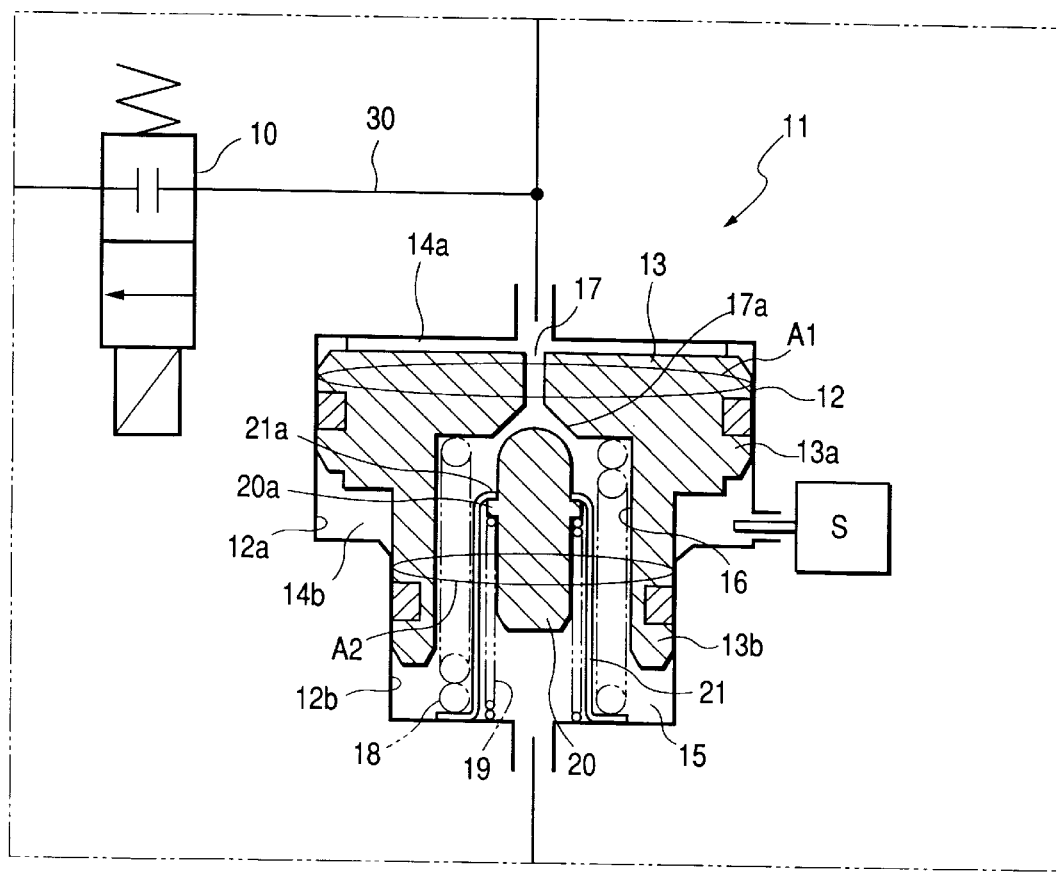
FIG. 2 is an enlarged view of portion C shown in FIG. 1(a)

Referring to accompanying drawings, an embodiment of the present invention will be explained as follows. FIG. 1(a) is an arrangement view of the device for controlling pressure of brake fluid of the embodiment, and FIG. 2 is an enlarged view of portion C shown in FIG. 1(a).

In FIG. 1(a), reference numeral 1 is a brake pedal, reference numeral 2 is a brake booster (first booster), reference numeral 3 is a master cylinder, and reference numeral 4 is a wheel cylinder (W/C). In the middle of a pipe arranged between the master cylinder 3 and the wheel cylinder 4, there are provided an anti-lock control device (ABS device) "A" including a holding valve 5, decay valve 6, reservoir 7 for controlling anti-lock operation, brake fluid pump 8 and motor 9, and a second booster "B" including a switch valve 10 made of an electromagnetic valve and passage shut-off device 11. In this connection, ABS device A and the second booster B are respectively arranged in the two piping route originating from the tandem master cylinder as shown in FIG. 1(a).

Compared with the conventional device for controlling pressure of brake fluid provided with a conventional anti-lock control device, the device for controlling pressure of brake fluid of the present invention is characterized in that: the structure of the holding valve 5 arranged in the anti-lock controlling device A is unique; and the second booster B is added into the pipe connecting the anti-lock controlling device with the master cylinder. The second booster makes the holding valve, decay valve and brake fluid pump come into action according to a command sent from an electronic control unit not shown in the drawing, so that the brake fluid boosting function can be exhibited.

Referring to FIG. 2, the second booster B will be explained as follows.

In FIG. 2, the second booster B comprises a switch valve 10 and a passage shut-off device 11. The passage shut-off device 11 is arranged between the master cylinder 3 and the holding valve 5. The switch valve 10 is arranged in the bypass passage 30 connecting the upstream pipe of the passage shut-off device 11 with the suction port of the hydraulic pump.

In the passage shut-off device 11, there is slidably provided a stepped piston 13 which is arranged in a two step type cylinder 12, the inner diameters of which are different from each other. The inside of the large diameter portion 12a of the cylinder is divided into a first hydraulic chamber 14a and an atmospheric chamber 14b by the large diameter piston 13a, the pressure receiving area of which is A1, of the stepped piston 13. The inside of the small diameter portion 12b is divided into the second hydraulic chamber 15 by the small diameter piston 13b, the pressure receiving area of which is A2, of the stepped piston 13. In the atmospheric chamber 14b, there is provided a switch S to detect the movement of the stepped piston 13. When switch S is turned on, the hydraulic pump 8 is operated by a signal sent from the electronic control unit not shown in the drawing, and at the same time, the switch valve 10 is repeatedly opened and closed.

At the center of the stepped piston 13, there is formed a valve accommodating chamber 16. This valve accommodating chamber 16 is communicated with the first hydraulic chamber 14a by the passage 17 formed in the piston 13. In the valve accommodating chamber 16, there is provided a cylindrical spring seat 21. On the outer circumference of this cylindrical spring seat 21, there is provided a spring 18 by which the stepped piston 13 is biased upward in the drawing. In this cylindrical spring seat 21, there is provided a valve 20. This valve 20 is biased upward by the valve spring 19 arranged in the cylindrical spring seat 21 so that a flange 20a of the valve 20 can be engaged with an engaging portion 21a of the cylindrical spring seat. When an upper end of the valve 20 comes into contact with a valve seat 17a formed in the passage 17 in the stepped piston 13, the passage can be shut off by the valve 20. However, when operation is not conducted, the valve 20 opens the passage 17 as shown in the drawing.

The bypass passage 30 branches from the passage connecting the master cylinder 3 with the passage shut-off device 11 and is connected with the suction port of the hydraulic pump 8, the decay valve 6 and the reservoir 7 as shown in the drawing. In this bypass passage 30, there is provided a switch valve 10 of two-position changeover type.

As shown in the enlarged drawing in FIG. 1(b) in which portion D in FIG. 1(a) is enlarged, the holding valve 5 is provided with a relief valve 5a which is arranged on the shutoff side. When hydraulic pressure on the wheel cylinder side is raised to a value not lower than a predetermined value in the case of shutting off the passage, the relief valve 5a allows brake fluid to flow from the wheel cylinder side to the passage shut-off device 11 side.

Operation of the device for controlling pressure of brake fluid constituted as described above will be explained as follows.

In FIG. 1(a), when the brake pedal is put on by a driver, the brake device is operated as follows. Hydraulic pressure is generated in the master cylinder by a force facilitated by the brake booster (first booster) 2. This hydraulic pressure is transmitted through the passage 17 formed in the stepped piston 13 arranged in the passage shut-off device 11 of the second booster B. Then the hydraulic pressure is transmitted to the wheel cylinder 4 through the holding valve 5, so that the brake is operated by the action of the wheel cylinder 4.

When the hydraulic pressure generated in the master cylinder is raised to a value not lower than a predetermined value, the stepped piston 13 is moved downward by the hydraulic pressure acting on the first hydraulic chamber 14a in the passage shut-off device 11 while resisting a biasing force of the spring 18, and a head portion of the valve 20 comes into contact with the valve seat 17a, so that the passage 17 can be closed. In the above state, the valve 20 functions as one way valve which allows brake fluid to flow from the master cylinder to the wheel cylinder side.

A relation between the hydraulic pressure in the case of operation of the passage shut-off device 11 and the force generated by the spring 18 will be explained below. The following equation is established, $$P \cdot A1 = P \cdot A2 + F,$$

where hydraulic pressure in the first hydraulic pressure chamber is P, force of the spring 18 is F, pressure receiving area of the large diameter piston 13a of the stepped piston 13 is A1, and pressure receiving area of the small diameter piston 13b of the stepped piston 13 is A2.

Accordingly, when hydraulic pressure P is raised to satisfy the following inequality, the stepped piston 13 is moved and the passage 17 is closed.

$$P(A1-A2)>F$$

When the stepped piston 13 is moved downward in the drawing, switch S is operated by the stepped piston 13, and the switch valve 10 is opened and closed by a signal sent from an electronic control unit not shown in the drawing, and at the same time, the motor 9 is driven and the hydraulic pump is operated. As a result, the hydraulic pump 8 sucks brake fluid from the master cylinder 3 via the switch valve 10, and brake fluid is fed to the wheel cylinder 4 via the holding valve 5 which is opened. In this way, the brake is given a force, that is, the brake force is increased.

As described above, in the device for controlling pressure of brake fluid of the present invention, the second booster is not operated in the usual operating region. In this case, the usual operating region is defined as a region before hydraulic pressure generated in the master cylinder is raised to a value not lower than a predetermined value. In case of emergency in which the hydraulic pressure of brake exceeds the predetermined value, a ratio of intensifying pressure is increased. As a result, it is possible to solve the aforementioned problem in which the brake force is not sufficiently strong when a driver is in panic in case of emergency. In this connection, when a volume of brake fluid discharged from the hydraulic pump is too large under the condition that the brake is given a force, brake fluid is circulated into the master cylinder via the relief valve 5a arranged in the holding valve 5.

When the brake pedal 1 is released, hydraulic pressure in the first hydraulic chamber 14a formed in the passage shut-off device 11 is decreased, and the stepped piston 13 is moved to a position shown in FIG. 2, so that the passage 17 can be opened. Therefore, hydraulic pressure in the wheel cylinder 4 returns to the master cylinder via the holding valve 5 and the passage shut-off device 11. When the stepped piston 13 is moved, switch S is turned off, and the switch valve 10 returns to the shut-off position, and at the same time, the hydraulic pump 8 is stopped.

In the case where there is a tendency of lock of the wheel when the brake is operated, a sensor not shown in the drawing detects the tendency of lock of the wheel in the same manner as that of the conventional device, and hydraulic pressure given to the brake is controlled by operating the holding valve 5, decay valve 6 and hydraulic pump 8 according to a signal sent from the electronic control unit not shown in the drawing, so that the tendency of lock of the wheel can be avoided. In this connection, while the decay valve 6 is opened in the process of anti-lock control, the switch valve 10 is closed according to a command sent from the electronic control unit as described later.

Figure 3:
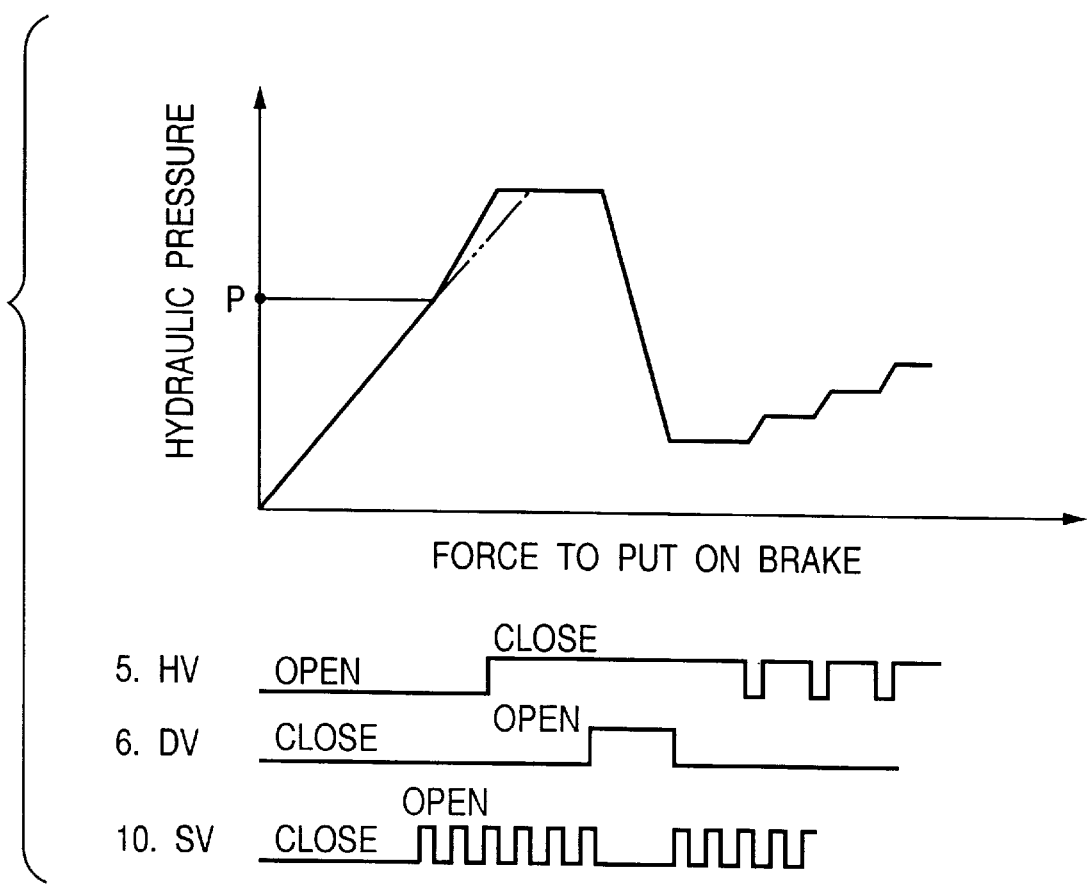
FIG. 3 is a diagram showing the hydraulic pressure and the conditions of operation of the holding valve, decay valve and switch valve of the device for controlling pressure of brake fluid of the embodiment.

FIG. 3 is a diagram showing the hydraulic pressure and the conditions of operation of the holding valve, decay valve and switch valve.

In FIG. 3, when hydraulic pressure P of the brake is increased in accordance with an increase in the force given onto the brake pedal by a driver and hydraulic pressure is raised to a predetermined value, the hydraulic pump 8 starts operation. If there is a tendency of lock of the wheel in this case, the holding valve 5 is closed, and hydraulic pressure of the brake is kept in this condition. When the hydraulic pressure of the brake must be further decreased, the decay valve 6 is opened, so that the hydraulic pressure of the brake can be decreased. Since the hydraulic pump 8 is in operation, when the decay valve 6 is opened and the reduction of hydraulic pressure is started, brake fluid sucked from the reservoir flows into the second hydraulic chamber 15 in the passage shut-off device 11, so that the stepped piston 13 is moved upward in FIG. 2 and the valve 20 is opened. As a result, brake fluid discharged from the hydraulic pump 8 flows through the valve 20, which has been opened, and circulates into the master cylinder. In accordance with the movement of the stepped piston 13, switch S in the passage shut-off device 11 is opened. Accordingly, the switch valve 10 is changed over to a closed condition according to a command sent from the electronic control unit while the decay valve 6 is opened. After that, when hydraulic pressure is raised, switch S in the passage shut-off device is closed again. In this way, the switch valve 10 conducts opening and closing motions.

In this device for controlling pressure of brake fluid of the present invention, when the first booster 2 is out of order, the second booster is operated by hydraulic pressure which has been increased by the master cylinder, and brake fluid fed from the hydraulic pump 8 is sent to the wheel cylinder via the holding valve 5, so that a force can be given to the brake. Accordingly, even if the first booster is out of order, it is possible to avoid the occurrence of a case in which the boosting function can not be exhibited at all.

In the case where the second booster is out of order, a force given onto the pedal can be assisted by the first booster in the same manner as that of the conventional device. Accordingly, the boosting function can be exhibited in the same manner as that of the conventional device.

Figure 4:
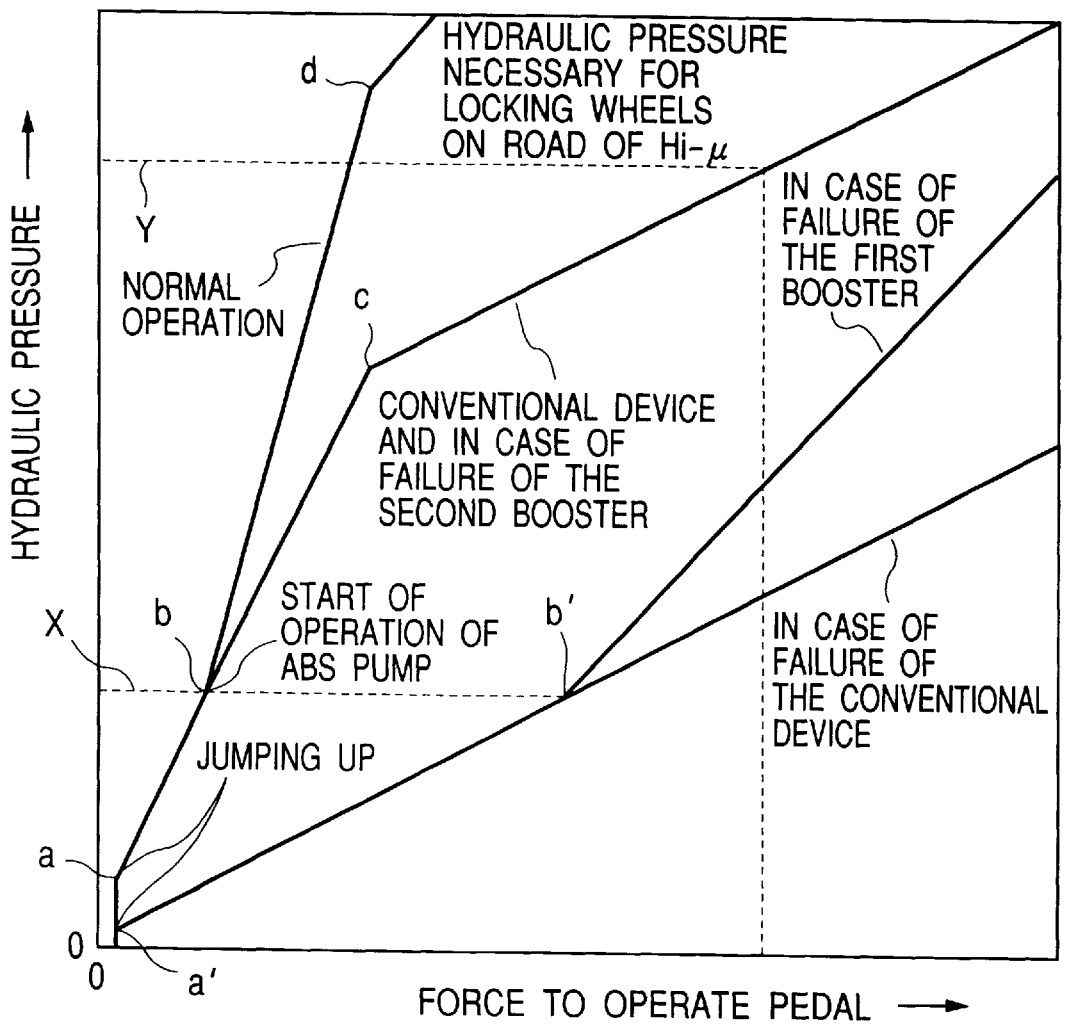
FIG. 4 is a diagram showing a relation between the hydraulic pressure of brake fluid and the force to operate the brake pedal of the device for controlling pressure of brake fluid of the embodiment.

FIG. 4 is a diagram showing a relation between the hydraulic pressure of brake fluid and the force to operate the brake pedal.

In the drawing, the horizontal axis represents a force given onto the brake pedal, and the vertical axis represents a hydraulic pressure. In the drawing, points "a" and "a'" are the rising points of hydraulic pressure of brake fluid at which hydraulic pressure is raised by the jumping-up function. In the drawing, line "X" represents a hydraulic pressure at which the hydraulic pump 8 starts operation, that is, line "X" represents a hydraulic pressure at which the passage shut-off valve 11 starts operation, and line "Y" represents a hydraulic pressure necessary for locking the wheels on a road of Hi-$\mu$.

When the brake pedal is operated by a driver in the device for controlling pressure of brake fluid of the present invention, the jumping-up function works, and then hydraulic pressure of brake fluid increases from point "a" in accordance with a force given onto the pedal. When a stronger force is given onto the pedal and hydraulic pressure is increased to hydraulic pressure "b" at which the passage shut-off valve 11 is operated, switch S in the passage shut-off valve is turned on, so that the hydraulic pump 8 starts operation, and a ratio of intensifying hydraulic pressure of brake fluid is increased. In this connection, at point "b" shown on the diagram, the pressure receiving area of the passage shut-off valve and the spring force are set so that hydraulic pressure can be in a range in which the brake is usually used, that is, in a range in which the deceleration is not higher than 0.3 G. As a result, in a normal operation in which hydraulic pressure is low, that is, in a normal operation in which hydraulic pressure is not higher than "b", the same brake feeling as that of the conventional brake device can be provided. After that, at point "d", the first booster reaches the limit of vacuum. Therefore, bending point "d" is generated on the line of hydraulic pressure on the diagram.

In the device of the present invention, when the second booster is out of order, hydraulic pressure is not increased from point "b" on the diagram, however, since the first booster is normally operated, a force is given to the brake by the same boosting function as that of the conventional brake device. In this connection, point "c" is a bending point generated by the limit of vacuum of the first booster.

In the case where the second booster is normally operated and the first booster is out of order, when hydraulic pressure of brake fluid exceeds point "b", the second booster starts operation, and the boosting function of the second booster can be exhibited as shown on the line after the bending point "b'" on the diagram.

As described above, the booster mechanism of the device for controlling pressure of brake fluid of the present invention is constituted by two systems, and the pressure mechanism of the anti-lock control device is utilized as the second booster. Due to the foregoing, when hydraulic pressure of the brake device is increased to a value not lower than a predetermined value in the case of normal operation, it is possible to obtain hydraulic pressure higher than that of the conventional brake device, and even in the case of a failure in the power source, the boosting function can be positively exhibited by utilizing hydraulic pressure fed from the second pressure source. As a result, it is possible to solve the aforementioned problem in which the brake force is not sufficiently strong when a driver is seized with panic in case of emergency. Also, it is possible to ensure the boosting function in the case of a failure of the pressure mechanism.

As the detail is described above, according to the present invention, since the passage shut-off valve is not operated in a region in which the brake device is usually used, that is, since the passage shut-off valve is not operated in a region in which the deceleration is not higher than 0.3 G, the second booster is not operated in this region. Therefore, the pedal feeling is the same as that of the conventional brake device. Therefore, it becomes possible for any driver to obtain the maximum deceleration while hydraulic pressure, at which the wheel is locked on a road of Hi-$\mu$, is set in a region of boosted hydraulic pressure and a force necessary for operating the brake pedal in a region of high deceleration is decreased. Even in case of emergency, for example, even when the power source is out of order, it is possible to positively obtain a boosting function by utilizing hydraulic pressure fed by the second pressure source, so that the safety of driving can be enhanced. The second booster can be constituted by utilizing the hydraulic pump, holding valve and decay valve arranged in the anti-lock control device. Therefore, when hydraulic pressure is given by the hydraulic pump, it is possible to conduct boosting operation only by a volume of hydraulic fluid fed from the master cylinder. Accordingly, the cost of the entire system can be decreased. The present invention can provide the above excellent effects.

What is claimed is:

1. A device for controlling pressure of brake fluid, comprising:
   an anti-lock control device;
   a passage shut-off device arranged in a pipe communicating a master cylinder with the anti-lock control device to thereby close the pipe;
   a bypass passage connecting a side of the passage shut-off device near the master cylinder with a sucking opening of a brake fluid pump of the anti-lock control device to allow brake fluid to flow from the master cylinder to the brake fluid pump; and
   a switch valve communicating with and closing the bypass passage,
   wherein said passage shut-off device includes
      a stepped cylinder having a large diameter portion provided on a first side near the master cylinder and a small diameter portion provided on a second side away from the master cylinder,
      a stepped piston slidably arranged in said stepped cylinder in a sealed manner and having a passage to communicate the master cylinder with the anti-lock control device,
      an elastic member to bias said stepped piston toward the master cylinder,
      a valve biased toward the master cylinder, wherein said passage of said stepped piston can engage with said valve by movement of said stepped piston, thereby closing the pipe, and
      a detecting device to detect the movement of said stepped piston,
      wherein the switch valve and the brake fluid pump are operated when the detecting device detects the movement of said stepped piston.

2. The device according to claim 1, wherein closing of the pipe by engagement of said passage and said valve is executed when a ratio between a hydraulic pressure on a side of the master cylinder and a pressure of the anti-lock control device exceeds a first value.

3. The device according to claim 2, wherein the first value is determined by a ratio between a large diameter of said large diameter portion and a small diameter of said small diameter portion of said stepped piston.

4. A device for controlling pressure of brake fluid, said device comprising a passage shut-off device arranged in a pipe communicating a master cylinder with a wheel cylinder to thereby close the pipe, wherein said passage shut-off device includes:
   a stepped cylinder having a large diameter portion provided on a first side and a small diameter portion provided on a second side thereof;
   a stepped piston slidably arranged in said stepped cylinder in a sealed manner and having a passage to communicate the master cylinder with the wheel cylinder;
   an elastic member to bias said stepped piston toward the master cylinder;
   a detecting device to detect movement of said stepped piston; and
   a valve biased toward the master cylinder,
   wherein, when the detecting device detects the movement of said stepped piston indicating engagement of said passage of said stepped piston and said valve, a pressure of said wheel cylinder is boosted in proportion to a pressure of said master cylinder so as to be assisted.

* * * * *